May 18, 1926.

L. JOHNSTON

LOG TRAILER

Filed August 22, 1925    2 Sheets-Sheet 1

1,584,862

INVENTOR.
L. Johnston
BY
ATTORNEY

May 18, 1926.
L. JOHNSTON
LOG TRAILER
Filed August 22, 1925  2 Sheets-Sheet 2
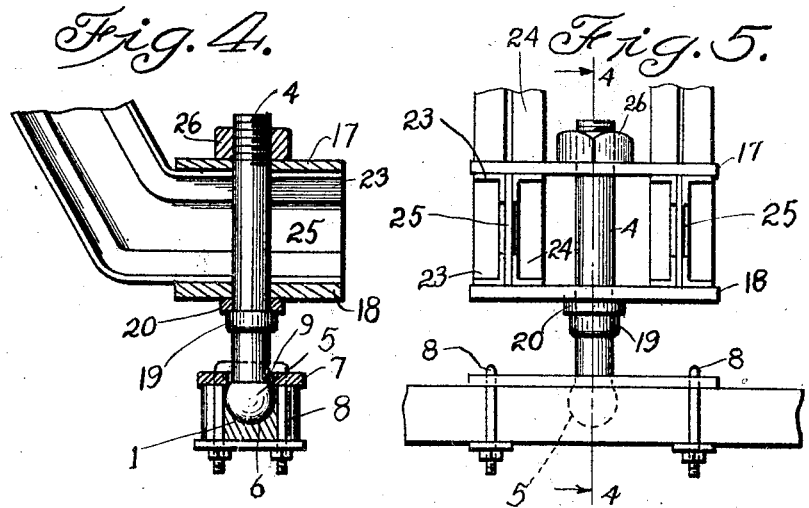
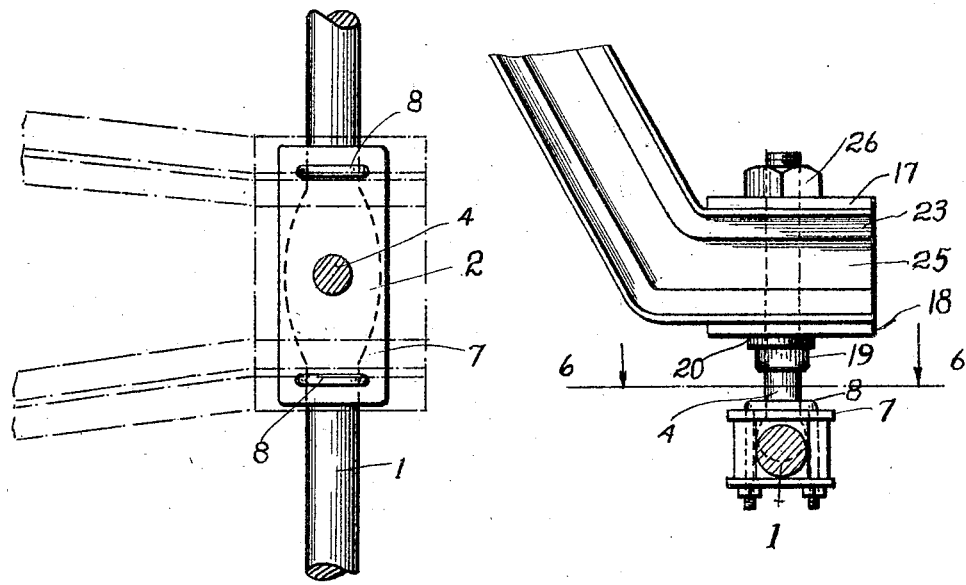
INVENTOR.
L. Johnston
BY
ATTORNEY Patented May 18, 1926.

1,584,862

UNITED STATES PATENT OFFICE.

LEONARD JOHNSTON, OF BELFAIR, WASHINGTON.

LOG TRAILER.

Application filed August 22, 1925. Serial No. 51,851.

This invention is directed to an improvement in trailers, designed particularly for use with motor driven vehicles and adapted more particularly for load carrying under difficult or adverse road conditions.

The invention has for its object the production of a trailer constructed with a view to permit such complete flexibility of the front axle with respect to load carrying structure as will compensate for irregularities in road construction and will avoid unusual and unexpected movements of the draft vehicle from being communicated to the load supporting structure of the trailer.

Figure 1:
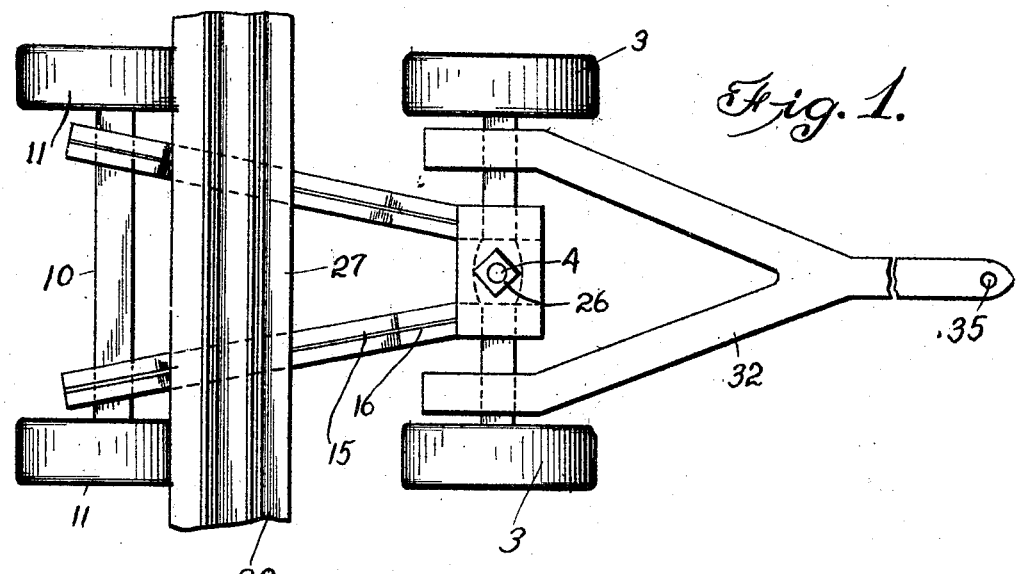
Figure 2:
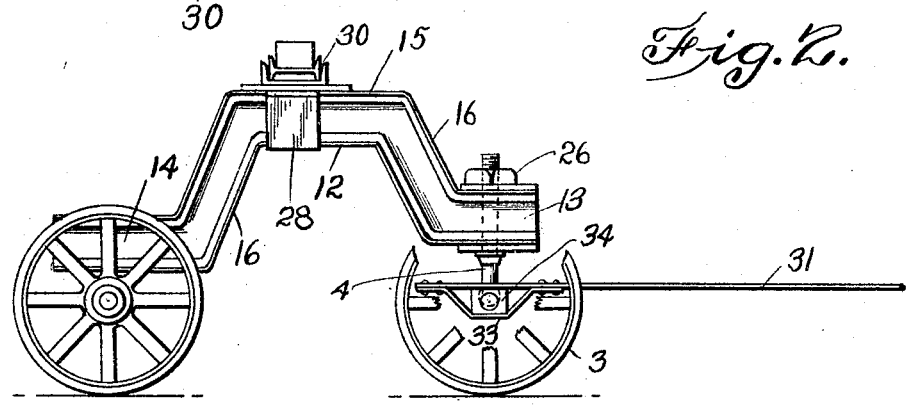
Figure 3:
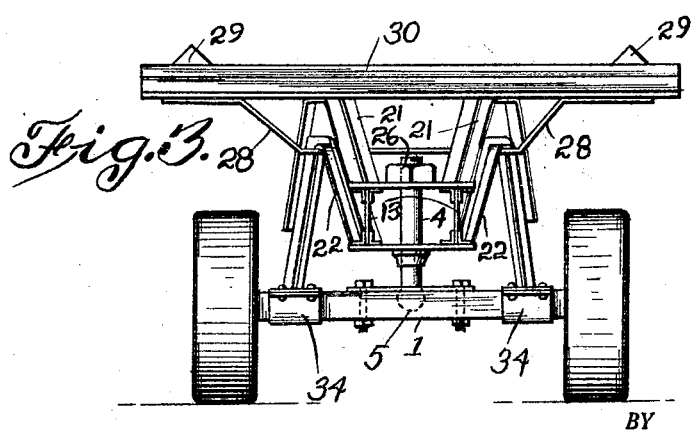

The invention is illustrated in the accompanying drawings in which:

Fig. 1 is a plan of the improved trailer.
Fig. 2 is a side elevation of same.
Fig. 3 is an end elevation of same.
Fig. 4 is a longitudinal section on line 4—4 of Fig. 5.
Fig. 5 is a front elevation of the universal connection.
Fig. 6 is a section on line 6—6 of Fig. 7.
Fig. 7 is a side elevation of the front axle universal connection with the axle in section.

The improved trailer comprises a front axle 1 preferably circular in transverse section and centrally enlarged at 2, the axle carrying the usual ground wheels 3. A king pin 4 of appropriate length and diameter is formed at the lower end as a somewhat enlarged ball 5, and the enlarged portion 2 of the front axle is formed with depressions thus to receive the ball. This depression is of semi-spherical form in its lower portion and merges into a cylindrical socket at the upper open end of a size to permit the introduction of the ball. A cover plate 7 secured to the axle by clips 8 overlies the ball and is formed with an opening 9 through which the king pin passes whereby the king pin is mounted for universal movement with respect to the axle, limited only in this respect by a cover plate 7. The trailer includes a rear axle 10 having ground wheels 11 and a load supporting structure 12. This load supporting structure is made up of spaced frame members which in plan converge from the rear to the front axle, and which in side elevation have a horizontal portion 13 overlying the front axle, a horizontal portion 14 overlying the rear axle on a plane below the horizontal portion 13, a load supporting intermediate portion 15 which by reason of upwardly projected inclined portions 16 inwardly of the respective axles is arranged in a plane materially above the horizontal plane of the end portions. The load supporting structure is adapted for rigid or movable action with the king pin 4, including for this purpose upper and lower bearing plates 17 and 18, the whole of which rests upon a collar 19 secured on the king pin with an interposed bearing washer 20.

Each frame bar of the load supporting structure is made up of upper and lower sections 21 and 22, and each of the sections are made up of similar angle bars 23 and 24, with their similar flanges embracing and secured to a tie plate 25 and their remaining flanges in alinement to provide a broad bearing surface. The plate 25 of course defines and distinguishes between the bearing plates 17 and 18 and the upper bearing plate 17 is secured in position on the king pin by a nut 26 engaging the upper threaded end of said pin. Each frame bar of the load supporting structure is thus made up of four angle iron strips connected by an intermediate plate so that the upper portion of the frame bar acts to directly support the load while the lower portion acts as an effective brace therefor.

A load receiving bed plate 27 is secured transverse the portions 15 of the load receiving tractor. This bed plate is further braced beyond the upper frame bars by a brace strip 28 secured to the lower frame bars 22, and extending beyond the supporting structure and underlying the bed plate adjacent the ends thereof. The bed plate, if desired, may be provided with the usual stops 29 which may be movable and adjustable as is usual in this type of device for holding the load in transportation and permitting it to be applied to or removed from the bed plate.

The bed plate may be provided with any convenient means such as indicated at 30 for receiving and conveniently handling the load.

The trailer is provided with draft beams 31 for divergent rear bars 32 which are secured by straps 33 to blocks 34 freely movable about the circular front axle 1, so that the draft beam is capable of free swinging relation to the axle in a vertical direction. The forward end of the draft beam is provided with an opening 35 to receive a connector from the tractor or other draft vehicle so that free lateral play between the draft vehicle and the trailer is permitted at this connection.

From the above description it will be apparent that through the draft connections vertical and lateral play is permitted between the tractor and trailer and that by the universal connection between the load supporting tractor and the trailer and this front axle, a very material amount of tilting of the front axle, incident to the similar movement of the tractor, will be permitted without disturbing the normal position of the load carrying structure.

Claims:

1. In a trailer a wheel structure including a front and rear axle and load supporting frame having a central raised load bearing portion and comprising forwardly convergent side frames, a king bolt about which the side frames are rigidly connected, and a universal mounting between the king bolt and front axle.

2. In a trailer a wheel structure including a front and rear axle and load supporting frame having a central raised load bearing portion and comprising forwardly convergent side frames, a king bolt about which the side frames are rigidly connected, and a universal mounting between the king bolt and front axle, said frame bars being made up of upper and lower sections each including two angle irons with their similar flanges arranged in the same plane.

3. In a trailer a wheel structure including a front and rear axle and load supporting frame having a central raised load bearing portion and comprising forwardly convergent side frames, a king bolt about which the side frames are rigidly connected, and a universal mounting between the king bolt and front axle, said frame bars being made up of upper and lower sections each including two angle irons with their similar flanges arranged in the same plane, and their remaining flanges secured to a plate extending between the sections.

In testimony whereof I affix my signature.

LEONARD JOHNSTON.